US007869176B2

(12) United States Patent
Davison

(10) Patent No.: US 7,869,176 B2
(45) Date of Patent: Jan. 11, 2011

(54) SURGE PROTECTED POWER SUPPLY

(75) Inventor: Ronald Stuart Davison, Vista, CA (US)

(73) Assignee: Hamilton Sundstrand Corporation, Rockford, IL (US)

( * ) Notice: Subject to any disclaimer, the term of this patent is extended or adjusted under 35 U.S.C. 154(b) by 355 days.

(21) Appl. No.: 11/807,230

(22) Filed: May 25, 2007

(65) Prior Publication Data

US 2008/0239604 A1 Oct. 2, 2008

Related U.S. Application Data

(60) Provisional application No. 60/921,162, filed on Mar. 30, 2007.

(51) Int. Cl.
*H02H 3/20* (2006.01)

(52) U.S. Cl. ......................... 361/91.1; 361/18; 361/111

(58) Field of Classification Search .................. 361/18, 361/56, 91.1, 111, 91.6, 118
See application file for complete search history.

(56) References Cited

U.S. PATENT DOCUMENTS 3,048,718 A * 8/1962 Starzec et al. .............. 361/91.6
3,604,951 A * 9/1971 Zgebura ..................... 327/473
3,931,546 A 1/1976 Jakobs et al.
5,088,018 A 2/1992 Lee
5,400,206 A 3/1995 Barnes et al.
5,461,262 A * 10/1995 Hirasawa et al. ........... 307/10.1
5,815,356 A * 9/1998 Rodriguez et al. ......... 361/91.6
5,838,526 A 11/1998 Ishikawa et al.
6,201,717 B1 * 3/2001 Grant .......................... 363/60
6,456,154 B2 * 9/2002 Sugimura ................... 327/537
6,483,376 B1 * 11/2002 Bienvenu et al. ............ 327/536
6,747,422 B2 * 6/2004 Yamamoto et al. .......... 315/307
6,859,091 B1 * 2/2005 Nicholson et al. ........... 327/536
6,924,533 B2 * 8/2005 Takemura et al. ........... 257/355
7,046,050 B1 * 5/2006 Schottler .................... 327/108

(Continued)

FOREIGN PATENT DOCUMENTS

DE 10144591 A1 4/2003

(Continued)

OTHER PUBLICATIONS

Abstract for JP2003108243 A. Apr. 2003.*

(Continued)

*Primary Examiner*—Jared J Fureman
*Assistant Examiner*—Christopher J Clark
(74) *Attorney, Agent, or Firm*—Kinney & Lange, P.A.

(57) ABSTRACT

An overvoltage protection circuit for protecting a pass element in a controlled voltage supply circuit electrically connected between a circuit power supply interconnection terminal region suited for electrical connection to a circuit power supply and an output terminal, the pass element being protected from voltage surges that may occur on the circuit power supply interconnection with respect to a voltage reference interconnection. A voltage reference is provided electrically connected in series with a voltage. The voltage divider and the voltage reference are connected in series with one another between the circuit power supply interconnection and the voltage reference interconnection. A threshold switch is electrically connected to a corresponding one of the voltage divider output and one of the voltage divider terminating regions terminating regions, and has an output coupled to the pass element control region.

24 Claims, 1 Drawing Sheet

U.S. PATENT DOCUMENTS 7,098,636 B2 * 8/2006 Koerner et al. .............. 323/268
7,102,862 B1 * 9/2006 Lien et al. ..................... 361/56
7,310,006 B2 * 12/2007 Shimada ...................... 326/83
7,379,310 B2 * 5/2008 Louvel et al. ................. 363/50
2004/0178471 A1 * 9/2004 Terashima .................. 257/510
2006/0038584 A1 * 2/2006 Mitsuda ....................... 326/33
2007/0285961 A1 * 12/2007 Park ........................... 365/129
2008/0055797 A1 * 3/2008 Wardzala ..................... 361/18
2008/0186644 A1 * 8/2008 Migliavacca ................. 361/86
2008/0238527 A1 * 10/2008 Bolz et al. .................. 327/404
2008/0266739 A1 * 10/2008 Migliavacca ............... 361/91.1

FOREIGN PATENT DOCUMENTS

| | | | | |
|---|---|---|---|---|
| EP | 0294887 | A | | 12/1988 |
| JP | 61147318 | A | | 7/1986 |
| JP | 2003108243 | A | * | 4/2003 |
| WO | WO 0118965 | A1 | * | 3/2001 |

OTHER PUBLICATIONS

Official Search Report and Written Opinion of the European Patent Office in counterpart foreign Application No. 07255090 filed Dec. 31, 2007.

* cited by examiner

SURGE PROTECTED POWER SUPPLY

CROSS-REFERENCE TO RELATED APPLICATION

This application claims the benefit of Provisional Patent Application No. 60/921,162 filed Mar. 30, 2007 for "SURGE PROTECTED POWER SUPPLY".

BACKGROUND

The present invention relates to regulated voltage supply circuits and, more particularly, to regulated voltage supply circuits with protection against the effects of voltage magnitude surges.

Modern aircraft have many electrical and electronic devices positioned and operating therein. All such devices, unless batteries or generators, require electrical power to be supplied thereto to operate, and usually also require, in at least some portions thereof, that this power be regulated in some sense. Typically, a voltage from a voltage source is supplied to such devices with the magnitude thereof regulated to some extent so as to generally remain at or near some selected value. Often, the supply electrical conductors over which such regulated voltage is supplied from the source to the devices extend for substantial distances through the aircraft and are connected to plural ones of such devices.

In operation, such aircraft will on occasion have to fly through or near thunderstorms and, as a result, will encounter lightening strikes thereon. Such strikes often cause short duration voltage magnitude surges on the supply electrical conductors, and such transient voltage excursions from the corresponding value selected therefor typically last somewhere around one to two hundred milliseconds and have peak magnitudes of several hundred Volts or more in waveform having a very rapid rise to such a voltage peak followed by a significantly slower falloff. Many of the devices supplied electrical power by the supply electrical conductors cannot withstand such surges without damage to at least some portions thereof, and so there is a desire to supply voltage of a selected value to such portions of these devices, or the entire device, in a manner protecting them, or it, from such surges.

SUMMARY

The present invention provides an overvoltage protection circuit for protecting a pass element in a controlled voltage supply circuit electrically connected between a circuit power supply interconnection terminal region suited for electrical connection to a circuit power supply and an output terminal region between which the pass element can be directed at a control region to provide a conductive path of a selected conductivity, the pass element being protected from voltage surges that may occur on the circuit power supply interconnection with respect to a voltage reference interconnection. A voltage reference capable of maintaining a substantially constant voltage between a pair of terminating regions for a range of electrical currents through that pair of terminating regions is provided electrically connected in series with a voltage divider capable of maintaining at an output thereof a selected fraction of the voltage between a pair of terminating regions. The voltage divider and the voltage reference are connected in series with one another between the circuit power supply interconnection and the voltage reference interconnection. A threshold switch having first and second terminating regions and a control region by which that threshold switch is capable of being directed to provide a conductive path between threshold device first and second terminating regions of a selected conductivity has the threshold device first terminating region and control region each being electrically connected to a corresponding one of the voltage divider output and one of the voltage divider terminating regions terminating regions, and has the second terminating region being coupled to the pass element control region.

DETAILED DESCRIPTION

Figure 1:
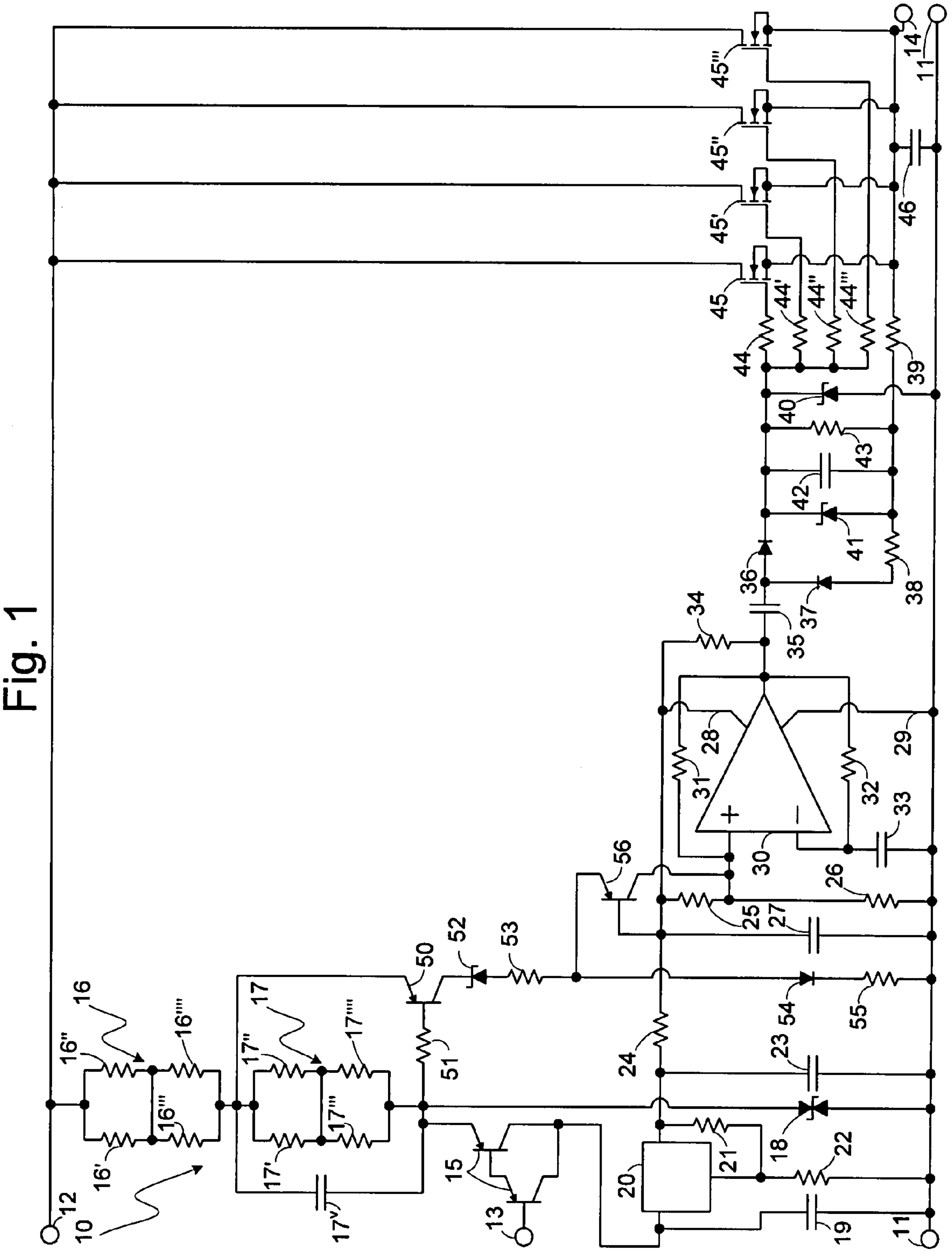
FIG. 1 is a schematic diagram of an electronic circuit embodying the present invention.

A schematic diagram is provided in FIG. 1 of a magnitude regulating electronic voltage supply circuit, 10, for providing a voltage at a selected value to other user circuits (not shown) connected to this voltage supply circuit to allow them to operate based on this provided voltage. An unregulated, or insufficiently regulated, source of voltage (not shown) provides voltage to circuit 10 having a magnitude usually at or near some selected nominal value with respect to a ground voltage reference terminal, 11, in supply circuit 10, this voltage supplied through a positive voltage source terminal electrically connected to a supplied voltage terminal, 12, in supply circuit 10. A control terminal, 13, is operated by a voltage supply operation initiation circuit (not shown) that selects between switching voltage supply circuit 10 off so as to not supply voltage to other user circuits at an output terminal thereof, 14, through placing control terminal 13 at a sufficiently large voltage with respect to ground voltage reference terminal 11, and switching voltage supply circuit 10 on so as to supply a regulated output voltage to the user circuits at output terminal 14 through placing control terminal 13 at a sufficiently small voltage with respect to terminal 11 while limiting the electrical current therethrough.

Control terminal 13 is electrically connected to the otherwise unconnected base of one of a pair of pnp bipolar transistors, 15, that are electrically connected to one another in a Darlington circuit configuration. The otherwise unconnected emitter of transistor pair 15 is electrically connected to a series connected pair of shorted bridge configuration resistor circuits, 16 and 17, at the interconnection between shorted bridge configuration resistor circuit 17 and a bidirectional zener diode, 18, that is also electrically connected in series with circuits 16 and 17. Bidirectional zener diode 18 has a selected breakdown voltage greater than the nominal value of voltage supplied to voltage terminal 12 typically a quarter to a third greater. The series connected group of shorted bridge configuration resistor circuits 16 and 17 and bidirectional zener diode 18 are electrically connected between supplied voltage terminal 12, to which shorted bridge configuration resistor circuit 16 has one end connected, and ground voltage reference terminal 11 to which bidirectional zener diode 18 has one end connected.

Thus, for voltages on supplied voltage terminal 12 that are less than the breakdown voltage of bidirectional zener diode 18 (and for voltages greater than this breakdown voltage as will be described below), the placing of a sufficiently low voltage on control terminal 13 switches on Darlington connected transistor pair 15 allows drawing electrical current through series connected shorted bridge configuration resistor circuits 16 and 17 without bidirectional zener diode 18 also drawing any current therethrough. This current drawn by Darlington connected transistor pair 15 through series connected shorted bridge configuration resistor circuits 16 and 17 is provided through the common collector interconnection of transistor pair 15 at the resulting voltage there, and this current is provided at the resulting voltage to the interconnection junction of a noise suppression capacitor, 19, having its opposite end electrically connected to ground voltage reference terminal 11, and the input of a commercially available integrated circuit chip voltage regulator, 20. Although a different switching device could be used, the high gain of Darlington connected transistor pair 15 results in very little of the current drawn through series connected shorted bridge configuration resistor circuits 16 and 17 being diverted from voltage regulator 20 out control terminal 13. Thus, voltage regulator 20 and its output load essentially determine the current drawn through transistor pair 15 and series connected shorted bridge configuration resistor circuits 16 and 17.

Shorted bridge configuration resistor circuit 16 has, at the end thereof connected to supplied voltage terminal 12, a pair of resistors, 16' and 16", electrically connected in parallel with one another and both connected at one end to supplied voltage terminal 12. A second pair of resistors, 16'" and 16"", in shorted bridge configuration resistor circuit 16, are electrically connected in parallel with one another and both are connected at one end thereof to one end of parallelly connected resistors 16' and 16" and at the opposite end thereof to shorted bridge configuration resistor circuit 17. These in shorted bridge configuration resistor circuit 16 resistors are of a relatively large resistance value and are provided as four resistors rather than one resistor of an equivalent value to be able to dissipate more heat developed therein by electrical currents therethrough.

Shorted bridge configuration resistor circuit 17 has, at the end thereof connected to shorted bridge configuration resistor circuit 16, a pair of resistors, 17' and 17", electrically connected in parallel with one another and both connected at one end to shorted bridge configuration resistor circuit 16. A second pair of resistors, 17'" and 17"", in shorted bridge configuration resistor circuit 17, are electrically connected in parallel with one another and both are connected at one end thereof to one end of parallelly connected resistors 17' and 17" and at the opposite end thereof to bidirectional zener diode 18. These resistors in shorted bridge configuration resistor circuit 17 are of a relatively small resistance values, typically having an equivalent resistance of one hundredth that of the equivalent resistance of the resistors in shorted bridge configuration resistor circuit 16 as an example. They are provided as four resistors rather than one resistor of an equivalent value to allow the ability for making small incremental changes in the equivalent value thereof through being able to independently change the value of each of the four different resistors to thereby provide selected increments in the equivalent value thereof in different implementations of circuit 10. A noise suppression capacitor, 17$^{v}$, has each side thereof electrically connected to a corresponding one of the two ends of shorted bridge configuration resistor circuit 17.

Voltage regulator chip 20 has a resistor, 21, electrically connected at one end to a regulated voltage output thereof, and the other end of the resistor to an output voltage sensing input of regulator chip 20. A resistor, 22, is electrically connected at one end to the output voltage sensing input of regulator chip 20 and at the other end to ground voltage reference terminal 11. The selection of magnitudes of the resistances of these two resistors allow selecting the magnitude of the output voltage provided by voltage regulator chip 20 which is typically from a third to a half of the nominal voltage supplied to supplied voltage terminal 12. A further noise suppression capacitor, 23, has one end electrically connected to the output of voltage regulator chip 20 and its opposite end electrically connected to ground voltage reference terminal 11.

Use of a zener diode here in place of voltage regulator 20 with a breakdown voltage matching the output voltage of that regulator is possible but poses a failure risk upon occurrences of voltage surges on supplied voltage terminal 12. There would be a corresponding surge of electrical current through that zener which could easily be great enough for it to overheat and fail. Voltage regulator 20 being a series pass element regulator will draw no more current than that which has been needed theretofore at its output by its load with the voltage surge instead being taken up across its series pass element along with shorted bridge configuration resistor circuits 16 and 17.

The output voltage provided at the output of voltage regulator chip 20 is provided through a small value current limiting resistor, 24, to an astable multivibrator arrangement in a charge pump circuit arrangement that is for providing a voltage between the gates and sources of a plurality of parallelly interconnected, n-channel, metal-oxide-semiconductor field-effect transistors (MOSFETs) operated in a source-follower circuit arrangement. These MOSFETs serve as the output power pass devices in a series type output voltage regulator to provide regulated output voltage at output terminal 14 of supply circuit 10 based on the nominal value voltage provided thereto at supplied voltage terminal 12.

The astable multivibrator arrangement has a pair of voltage divider resistors, 25 and 26, electrically connected in series with one another and having one end thereof electrically to the end of resistor 24 not connected to the output of voltage regulator chip 20 to be between resistor 24 and ground voltage reference terminal 11 to which the other end of the voltage divider is electrically connected. A noise suppression capacitor, 27, has each side thereof electrically connected to a corresponding one of the two ends of this voltage divider. In addition, this same end of resistor 24 is connected to a positive voltage supply lead, 28, and a relatively negative voltage supply lead, 29, from ground voltage reference terminal 11, form the voltage supply and ground return interconnections for a commercially available integrated circuit chip comparator, 30, and are electrically connected thereto at the corresponding comparator interconnection terminals. The interconnection junction of resistors 25 and 26 forming the voltage divider, just described above, provide a comparator reference voltage value for comparator 30 by being electrically connected to the positive input terminal, or positive control input or control region, of that comparator.

A resistor, 31, is electrically connected between the output terminal of comparator 30 and the positive input terminal of that comparator to thereby provide positive feedback to result in a regenerative process following a sufficient voltage "triggering" excursion at the comparator negative input terminal, or negative control input or control region thereof, with a polarity matching that of the current output state and also in a hysteretic switching characteristic. This regenerative process causes the output to rapidly change toward next being in the opposite one of two possible output states alternative to that state which was current at the "triggering", these states being approximately at the extremes in the comparator output voltage operating range between the two voltage values to which the comparator is connected, the voltage at resistor 24 and ground at ground voltage reference terminal 11. A further resistor, 32, is electrically connected between the output terminal of comparator 30 and the negative input terminal of that comparator to thereby provide negative feedback and to charge and discharge a capacitor, 33, electrically connected between that negative input terminal and ground voltage reference terminal 11. The charging and discharging of capacitor 33 provides sequential "triggerings" at the negative input terminal of comparator 30 so that neither of the comparator output voltage states is stable over time and so oscillates between those output voltage states. A further resistor, 34, is electrically connected between the end of resistor 24 and the output of comparator 30 to provide supplementary electrical current at this output when the output is in or near the relatively positive output voltage state, current which is drawn away at the comparator output when in or near the negative output voltage state.

This oscillating of the output voltage of comparator 30 between its two voltage extremes serves to charge and discharge a capacitor, 35, connected on one end thereof to the output of comparator 30 and on the other end to the interconnection junction between two diodes, 36 and 37, an arrangement which provides isolation between voltage values occurring on either side of capacitor 35 with respect to voltages that consist of sufficiently small frequency components. Capacitor 35 is connected to the anode of diode 36 and to the cathode of diode 37. The anode of diode 37 is connected through two current limiting resistors, 38 and 39, electrically connected in series with one another, to output terminal 14 of supply circuit 10. The cathode of diode 36 is electrically connected to several circuit components including the cathode of a zener diode, 40, which has its anode electrically connected to ground voltage reference terminal 11. The breakdown voltage selected for zener diode 40 sets the output voltage provided by supply circuit 10 on output terminal 14 thereof at the value of that breakdown voltage less the gate to source voltage of the supply circuit 10 pass MOSFETS to be described below.

In addition, the cathode of diode 36 is electrically connected to the cathode of a further zener diode, 41, having its anode electrically connected to the junction between resistors 38 and 39, and to one side of each of a capacitor, 42, and a resistor, 43, both of which have their opposite sides also electrically connected to the junction between resistors 38 and 39. The breakdown voltage for zener diode 41 is on the order of eight tenths that of the output voltage of voltage regulator 20 and limits the gate to source voltage of the supply circuit 10 pass MOSFETS to be described below. The capacitance of capacitor 42 is much larger than that of capacitor 35, typically on the order of twenty times as large for example.

Finally, the cathode of diode 36 is electrically connected to one end of each of a plurality of resistors, 44, 44', 44" and 44'". The opposite ends of each of these resistors are each electrically connected to the gate of a corresponding one of a plurality of parallelly interconnected, n-channel, metal-oxide-semiconductor field-effect transistors (MOSFETs), 45, 45', 45" and 45'", which are the output power transistors serving as the pass elements of this series regulator formed by supply circuit 10. The sources of each of these MOSFETs are electrically connected to output terminal 14 of supply circuit 10, and the drains of each of these MOSFETs are electrically connected to supplied voltage terminal 12. An interrupted supply voltage maintenance capacitor, 46, has one side thereof electrically connected to output terminal 14 of supply circuit 10 and the other side electrically connected to ground voltage reference terminal 11. This capacitor has a relatively large capacitance chosen to be large enough to maintain the voltage across an output load connected between output terminal 14 and ground terminal 11 for times exceeding those occurring for circuit protection interruptions in the operation of supply circuit 10 as a result of encountering voltage surges on supplied voltage terminal 12.

When the output of comparator 30 is in its low state, capacitor 35 is charged (discharged from previous charge) from the voltage at output terminal 14 (set by the load and capacitor 46) through resistors 38 and 39 and diode 37 with diode 36 being reversed biased to prevent discharging capacitor 42. The oscillatory change in comparator 30 to the opposite output voltage high state leads to the output of comparator 30, resistor 34 and charged capacitor 35 together charging relatively larger capacitors 42 and 46 with the charging current limited by resistor 39. The oscillation of output states of comparator 30 causes this charging of capacitors 42 and 46 to occur repeatedly so that the voltage across them increases (which charging is countered in capacitor 46 by its discharging in the other half the cycle to a net charge change of zero, but there is in any event little of either charging or discharging of capacitor 46 because of the large capacitance value of that capacitor).

The voltage across capacitors 42 and 46 is limited in two respects, first, the voltage across capacitor 42, which sets and maintains the gate to source voltage of each of pass MOSFETS 45, 45', 45" and 45'", is limited by the breakdown voltage of zener diode 41 to protect those gates. Further, the voltage drop across capacitors 42 and 46 connected in series with one another between the cathode of diode 36 and ground voltage reference terminal 11 is limited by the breakdown voltage of zener diode 40. This last breakdown voltage less the gate to source voltage of each of pass MOSFETS 45, 45', 45" and 45'" is the maximum output voltage supplied at output terminal 14 of supply circuit 10. That maximum voltage and the alternative lesser voltages typically provided there, depending on the voltage occurring on supplied voltage terminal 12, are maintained on terminal 14 by the repeated charging of capacitor 42 during continual circuit operation (and of capacitor 46 but which charging, as indicated above, is countered in capacitor 46 by its discharging in the other half the cycle to net to net the very small changes therein to zero) with the capacitor 42 voltage remaining independent of the voltage on capacitor 46 so long as the voltage drop across capacitors 42 and 46 is less than the breakdown voltage of zener diode 40.

That is, the voltage maintained on capacitor 42 will keep pass MOSFETS 45, 45', 45" and 45'" switched on in saturation, and so very near to the voltage on supplied voltage terminal 12, so long as that voltage remains less than the breakdown voltage of zener diode 40. Thus, in this circumstance, pass MOSFETS 45, 45', 45" and 45'" will keep capacitor 46 charged to near that voltage occurring on supplied voltage terminal 12. As a result, the output voltage at output terminal 14 of supply circuit 10 in this circumstance, being close to the nominal value of the voltage provided to supply circuit 10 on supplied voltage terminal 12, will in this circuit arrangement result in pass MOSFETS 45, 45', 45" and 45'" being operated in or near saturation to keep the power dissipated in them relatively small.

Any charging attempts through the oscillation of the output voltage of comparator 30 of capacitors 42 and 46 to a sum thereacross beyond the breakdown voltage of zener diode 40 are returned to ground through that diode. Hence, the relatively small increases in the voltage provided on supplied voltage terminal 12 in the last circumstance that keep the voltage potential less than the breakdown voltage of zener diode 40 are dropped first across capacitor 46 until a voltage is reached causing zener 40 to conduct. However, larger increases in the voltage provided on supplied voltage terminal 12, large enough to place the voltage potential to being greater than the breakdown voltage of zener diode 40, are dropped across the drains of pass MOSFETS 45, 45', 45" and 45'"

resulting in the output voltage on output terminal 14 being limited, in the presence of such larger voltages on supplied voltage terminal 12, to a maximum value equal to the breakdown voltage of zener diode 40 less the gate to source voltage of those pass elements. The voltage on terminal 14 remains at this maximum in the presence of these larger voltages on supplied voltage terminal 12 with the gate to source voltage of pass MOSFETS 45, 45', 45" and 45'" decreasing due to the current drained through now conducting zener 40 sufficiently to force them into their pinch-off or linear operating region.

But, as the magnitudes of these increases in voltage provided on supplied voltage terminal 12 get even larger, so does the power that must be dissipated in those MOSFETs as their drain voltages correspondingly increase. Surges of voltage in the range resulting from lightning strikes can cause dissipation in these MOSFETs that exceed their safe operating areas, and so protection of them leads to the need to cause them to be switched off at least for a time sufficient for such surges to have fallen in magnitude sufficiently for the danger to the pass MOSFETs to have passed. During such times those MOSFETs are switched off, the stored charge on interrupted supply voltage maintenance capacitor 46 will supply the voltage needed by electrical loads connected between output terminal 14 of supply circuit 10 and ground voltage reference terminal 11.

The need for such switching off of the pass MOSFETS 45, 45', 45" and 45'" in times of extreme voltage surge occurrences on supplied voltage terminal 12 must first be sensed and the sensing portion of the sensing and switching circuitry for this switching off of them is provided by a pnp bipolar transistor, 50. Transistor 50 has its emitter electrically connected to the junction of shorted bridge configuration resistor circuits 16 and 17 and has its base electrically connected through a current limiting resistor, 51, to the junction of shorted bridge configuration resistor circuit 17 and bidirectional zener diode 18. The current drawn through transistor pair 15 for voltage regulator 20 and the circuitry supplied thereby, and the current drawn through zener diode 18 if the voltage surge on supplied voltage terminal 12 exceeds the breakdown voltage of that zener diode only some relatively small value, causes only an insufficient voltage drop across shorted bridge configuration resistor circuit 17 to switch on transistor 50. This is because of the small equivalent resistance value of shorted bridge configuration resistor circuit 17 relative to that of shorted bridge configuration resistor circuit 16.

During sufficiently large voltage surges on supplied voltage terminal 12, however, as set by the resistor values used in shorted bridge configuration resistor circuits 16 and 17 and the breakdown voltage of bidirectional zener diode 18, transistor 50 will be switched on as substantial additional electrical current flows in shorted bridge configuration resistor circuit 17 and through bidirectional zener diode 18 as a result of the voltage surge on supplied voltage terminal 12 exceeding the breakdown voltage of that zener diode. That breakdown voltage maintains the voltage value at resistor 51 connected to the base of transistor 50, and also across transistor pair 15 and the input of voltage regulator 20.

The switching on of transistor 50 through its emitter voltage being increased with respect to its base voltage by the voltage drop occurring across shorted bridge configuration resistor circuit 17 causes an electrical current to flow from its collector through a zener diode, 52, from its cathode to its anode and through a resistor, 53. Part of this current sets the voltage at the junction of resistor 53 and the anode of a diode, 54, by flowing in that diode and a resistor, 55, electrically connecting the cathode of that diode to ground voltage reference terminal 11. This voltage value at the junction of resistor 53 and the anode of diode 54 is set by the resistor values and the breakdown voltage of zener 52 to be more that that supplied at the output of voltage regulator 20 by at least the emitter to base voltage of a further pnp bipolar transistor, 56, having its emitter electrically connected to this junction. The base of transistor 56 is connected to the end of resistor 24 opposite the end thereof connected to the regulated output of voltage regulator 20, and the collector of transistor 56 is connected to the positive input terminal of comparator 30. As a result, the switching on of transistor 50 increases the voltage on the emitter of transistor 56 sufficiently to switch on this latter transistor into saturation to thereby increase the voltage on the positive input terminal of comparator 30 above the voltage supplied to its positive voltage terminal through interconnection 28 thereby ceasing its output voltage oscillation. The voltage on capacitor 42 setting the voltage between the gate and source of each of pass MOSFETS 45, 45', 45" and 45'" is quickly dissipated through resistor 43 thereby switching off those MOSFETs.

The switching on of transistor 50 can be caused to occur at different selected values of sufficient surge voltage increases between supplied voltage terminal 12 and ground voltage reference terminal 11 by adjusting the value of the equivalent resistance in shorted bridge configuration resistor circuit 17, through suitably selecting the resistance values of the resistors therein, relative to the equivalent resistance in shorted bridge configuration resistor circuit 16. If, for example, the switching on of transistor 50 is set to occur at a relatively smaller surge voltage increase value (even though the surge voltage reaches a much greater value peak) by such resistor value selections, fewer members may be needed in the plurality of parallelly interconnected, n-channel, MOSFETs 45, 45', 45" and 45'" as there will be less voltage dropped across them thus allowing larger currents through each so that the total current can be split between fewer of them while still leaving each in its safe operating area.

A table of typical active component selections, and typical passive component parameter values, for the circuit of FIG. 1 is the following:

| |
|---|
| $V_{12}$ = 28 V |
| $R_{16'}$ = 1 kΩ |
| $R_{16''}$ = 1 kΩ |
| $R_{16'''}$ = 1 kΩ |
| $R_{16''''}$ = 1 kΩ |
| $R_{17'}$ = 10 Ω |
| $R_{17''}$ = 10 Ω |
| $R_{17'''}$ = 10 Ω |
| $R_{17''''}$ = 10 Ω |
| $C_{17}{}^{v}$ = 1000 pF |
| $V_{Z18}$ = 36 V |
| $C_{19}$ = 0.1 μF |
| $VR_{20}$: LM117H |
| $R_{21}$ = 249 Ω |
| $R_{22}$ = 2 kΩ |
| $C_{23}$ = 1.0 μF |
| $R_{24}$ = 20 Ω |
| $R_{25}$ = 10 kΩ |
| $R_{26}$ = 10 kΩ |
| $C_{27}$ = 0.47 μF |
| $Comp_{30}$: LM211 |
| $R_{31}$ = 10 kΩ |
| $R_{32}$ = 10 kΩ |
| $C_{33}$ = 1000 pF |
| $R_{34}$ = 4.99 kΩ |
| $C_{35}$ = 1000 pF |
| $R_{38}$ = 1 kΩ |
| $R_{39}$ = 1 kΩ |
| $V_{Z40}$ = 43 V |

-continued

| |
|---|
| $V_{z41}$ = 10 V |
| $C_{42}$ = 0.01 μF |
| $R_{43}$ = 100 kΩ |
| $R_{44}$ = 10 Ω |
| $R_{44'}$ = 10 Ω |
| $R_{44''}$ = 10 Ω |
| $R_{44'''}$ = 10 Ω |
| $MOS_{45}$: STB7NK00Z |
| $MOS_{45'}$: STB7NK00Z |
| $MOS_{45''}$: STB7NK00Z |
| $MOS_{45'''}$: STB7NK00Z |
| $C_{46}$ = 5600 μF |
| $V_{Z52}$ = 10 V |
| $R_{51}$ = 20 Ω |
| $R_{53}$ = 2 kΩ |
| $R_{55}$ = 100 kΩ |

Although the present invention has been described with reference to preferred embodiments, workers skilled in the art will recognize that changes may be made in form and detail without departing from the spirit and scope of the invention.

The invention claimed is:

1. An overvoltage protection circuit for protecting a pass element in a controlled voltage supply circuit electrically connected between a circuit power supply interconnection terminal region suited for electrical connection to a circuit power supply and an output terminal region between which the pass element can be directed at a control region thereof to provide a conductive path of a selected conductivity, the pass element being protected from voltage surges that may occur on the circuit power supply interconnection with respect to a voltage reference interconnection, the circuit comprising:

a first voltage reference capable of maintaining a substantially constant selected voltage between a pair of terminating regions for a range of electrical currents through that pair of terminating regions, a second voltage reference capable of maintaining a substantially constant selected voltage between a pair of terminating regions for a range of electrical currents through that pair of terminating regions, one of the pair of terminating regions of the second voltage reference being electrically connected to the pass element at only the control input thereof and the other being electrically connected to the voltage reference interconnection, a voltage divider capable of maintaining at an output thereof a selected fraction of the voltage between a pair of terminating regions, the voltage divider and the first voltage reference having their terminating regions electrically connected in series with one another between the circuit power supply interconnection and the voltage reference interconnection, and a threshold switch having first and second terminating regions and a control region by which that threshold switch is capable of being directed to provide a conductive path between threshold switch first and second terminating regions of a selected conductivity, the threshold switch first terminating region and control region each being electrically connected to a corresponding one of the voltage divider output and one of the voltage divider terminating regions and the threshold switch second terminating region being coupled through a switching circuit to the pass element control region so as to be capable of having the switching circuit switch the pass control element onto a nonconducting condition from previously selected conducting conditions upon sufficiently large voltages occurring between the circuit power supply and voltage reference interconnections.

2. The circuit of claim 1 further comprising a support capacitor being electrically connected on one side thereof to the output terminal region and being electrically connected on the opposite side thereof to the voltage reference interconnection.

3. The circuit of claim 2 wherein the pass element comprises at least one n-channel MOSFET having the drain thereof electrically connected to the circuit power supply interconnection terminal region, the source thereof electrically connected to the output terminal region, and the gate thereof serving as the pass element control region.

4. The circuit of claim 1 wherein the pass element comprises at least one n-channel MOSFET having the drain thereof electrically connected to the circuit power supply interconnection terminal region, the source thereof electrically connected to the output terminal region, and the gate thereof serving as the pass element control region.

5. The circuit of claim 4 wherein the pass element comprises a plurality of n-channel MOSFETs each having the drain thereof electrically connected to the circuit power supply interconnection terminal region, the source thereof electrically connected to the output terminal region, and the gate thereof electrically connected to the pass element control region.

6. The circuit of claim 1 wherein the voltage divider has between the output thereof and one of the pair of terminating regions at least four interconnected resistors in two parallely interconnected pairs forming a shorted bridge configuration resistor circuit.

7. The circuit of claim 6 wherein the voltage divider has between the output thereof and the other of the pair of terminating regions at least four interconnected resistors in two parallely interconnected pairs forming a shorted bridge configuration resistor circuit.

8. An overvoltage protection circuit for protecting a pass element in a controlled voltage supply circuit electrically connected between a circuit power supply interconnection terminal region suited for electrical connection to a circuit power supply and an output terminal region between which the pass element can be directed at a control region thereof to provide a conductive path of a selected conductivity, the pass element being protected from voltage surges that may occur on the circuit power supply interconnection with respect to a voltage reference interconnection, the circuit comprising:

a first voltage reference capable of maintaining a substantially constant selected voltage between a pair of terminating regions for a range of electrical currents through that pair of terminating regions, a voltage divider capable of maintaining at an output thereof a selected fraction of the voltage between a pair of terminating regions, the voltage divider and the first voltage reference having their terminating regions electrically connected in series with one another between the circuit power supply interconnection and the voltage reference interconnection, and a threshold switch having first and second terminating regions and a control region by which that threshold switch is capable of being directed to provide a conductive path between threshold switch first and second terminating regions of a selected conductivity, the threshold switch first terminating region and control region each being electrically connected to a corresponding one of the voltage divider output and one of the voltage divider terminating regions and the threshold switch second terminating region being coupled through a switching circuit to the pass element control region so as to be capable of having the switching circuit switch the pass control element onto a nonconducting condition from previously selected conducting conditions upon sufficiently large voltages occurring between the circuit power supply and voltage reference interconnections' the switching circuit provided with a charge pump having an output electrically connected to the pass element control region and a first control region electrically connected to the second terminating region of the threshold switch, the charge pump being capable of being directed at the first control region to provide a selected voltage at the charge pump output.

9. The circuit of claim 8 wherein the charge pump has a second control region with the charge pump being capable of being directed at the second control region to provide a selected voltage at the charge pump output.

10. The circuit of claim 9 further comprising a regulated voltage source having an input suited for electrical connection to a source of voltage and an output electrically connected to the charge pump second control region at which a regulated voltage of a selected value is provided in response to a voltage being provided on the input thereof.

11. The circuit of claim 10 further comprising a control switch having first and second terminating regions and a control region by which that control switch is capable of being directed to provide a conductive path between control switch first and second terminating regions of a selected conductivity, the control switch first terminating region being electrically connected to terminating regions of the voltage divider and the first voltage reference and the control switch second terminating region being electrically connected to the regulated voltage source input.

12. The circuit of claim 10 further comprising an oscillator having an input electrically connected to the charge pump second control region and an output at which that oscillator is capable of providing an oscillating value voltage in response to a voltage being provided on the input thereof.

13. The circuit of claim 12 further comprising a coupling capacitor having one side thereof electrically connected to the oscillator output and the other side thereof electrically connected to the junction of the anode of a charge pump output diode and the cathode of a charge pump input diode, the cathode of the charge pump output diode being electrically connected to the charge pump output and the anode of the charge pump input diode being coupled to the output terminal region, there being a charge pump capacitor and a charge pump capacitance discharge resistor electrically connected in parallel with one another between the charge pump output diode cathode and the charge pump input diode anode.

14. The circuit of claim 13 further comprising a second voltage reference capable of maintaining a substantially constant selected voltage between a pair of terminating regions for a range of electrical currents through that pair of terminating regions, one of the pair of terminating regions of the second voltage reference being electrically connected to the charge pump output and the other being electrically connected to the voltage reference interconnection.

15. The circuit of claim 14 further comprising a support capacitor being electrically connected on one side thereof to the output terminal region and being electrically connected on the opposite side thereof to the voltage reference interconnection.

16. The circuit of claim 14 wherein the pass element comprises at least one n-channel MOSFET having the drain thereof electrically connected to the circuit power supply interconnection terminal region, the source thereof electrically connected to the output terminal region, and the gate thereof serving as the pass element control region.

17. The circuit of claim 13 further comprising a third voltage reference capable of maintaining a substantially constant selected voltage between a pair of terminating regions for a range of electrical currents through that pair of terminating regions, one of the pair of terminating regions of the third voltage reference being electrically connected to the charge pump output and the other being coupled to the anode of the charge pump input diode.

18. The circuit of claim 13 further comprising a support capacitor being electrically connected on one side thereof to the output terminal region and being electrically connected on the opposite side thereof to the voltage reference interconnection.

19. The circuit of claim 13 wherein the pass element comprises at least one n-channel MOSFET having the drain thereof electrically connected to the circuit power supply interconnection terminal region, the source thereof electrically connected to the output terminal region, and the gate thereof serving as the pass element control region.

20. The circuit of claim 8 further comprising a second voltage reference capable of maintaining a substantially constant selected voltage between a pair of terminating regions for a range of electrical currents through that pair of terminating regions, one of the pair of terminating regions of the second voltage reference being electrically connected to the charge pump output and the other being electrically connected to the voltage reference interconnection.

21. An overvoltage protection circuit for protecting a pass element in a controlled voltage supply circuit electrically connected between a circuit power supply interconnection terminal region suited for electrical connection to a circuit power supply and an output terminal region between which the pass element can be directed at a control region thereof to provide a conductive path of a selected conductivity, the pass element being protected from voltage surges that may occur on the circuit power supply interconnection with respect to a first voltage reference interconnection, the circuit comprising:

a control switch having first and second terminating regions and a control region by which that control switch is capable of being directed to provide a conductive path between control switch first and second terminating regions of a selected conductivity, the control switch first terminating region being suited for electrical connection to a source of voltage;

a condition occurrence switch having an output terminal at which a signal is provided upon determination that a selected circuit condition has occurred, a regulated voltage source having an input electrically connected to the control switch second terminating region and an output at which a regulated voltage of a selected value is provided in response to a voltage being provided on the input thereof, and a charge pump having an output electrically connected to the pass element control region and a first control region electrically connected to the regulated voltage source output and at which the charge pump is capable of being directed to provide a selected voltage at the charge pump output and a second control region electrically connected to the condition occurrence switch output terminal and at which the charge pump is capable of being directed to cease providing a selected voltage at the charge pump output despite being directed to do so at the first control region.

22. The circuit of claim 21 further comprising an oscillator having an input electrically connected to the charge pump first control region and an output at which that oscillator is capable of providing an oscillating value voltage in response to a voltage being provided on the input thereof.

23. The circuit of claim 22 further comprising a coupling capacitor having one side thereof electrically connected to the oscillator output and the other side thereof electrically connected to the junction of the anode of a charge pump output diode and the cathode of a charge pump input diode, the cathode of the charge pump output diode being electrically connected to the charge pump output and the anode of the charge pump input diode being coupled to the output terminal region, there being a charge pump capacitor and a charge pump capacitance discharge resistor electrically connected in parallel with one another between the charge pump output diode cathode and the charge pump input diode anode.

24. The circuit of claim 23 further comprising a second voltage reference capable of maintaining a substantially constant selected voltage between a pair of terminating regions for a range of electrical currents through that pair of terminating regions, one of the pair of terminating regions of the second voltage reference being electrically connected to the charge pump output and the other being electrically connected to the first voltage reference interconnection, and with there being a support capacitor being electrically connected on one side thereof to the output terminal region and being electrically connected on the opposite side thereof to the first voltage reference interconnection, and wherein the pass element comprises at least one n-channel MOSFET having the drain thereof electrically connected to the circuit power supply interconnection terminal region, the source thereof electrically connected to the output terminal region, and the gate thereof serving as the pass element control region.

* * * * *